United States Patent [19]

Sheem

[11] 4,264,126

[45] Apr. 28, 1981

[54] OPTICAL FIBER-TO-FIBER EVANESCENT FIELD COUPLER

[76] Inventor: Sang K. Sheem, 3927 Sonora Pl., Alexandria, Va. 22309

[21] Appl. No.: 11,976

[22] Filed: Feb. 14, 1979

[51] Int. Cl.³ ............................................... G02B 5/14
[52] U.S. Cl. ................................. 350/96.15; 350/96.16
[58] Field of Search ........................... 350/96.15, 96.16

[56] References Cited

U.S. PATENT DOCUMENTS

| | | | |
|---|---|---|---|
| 4,054,366 | 10/1977 | Barnoski et al. | 350/96.15 |
| 4,087,156 | 5/1978 | Kao et al. | 350/96.15 |
| 4,136,929 | 1/1979 | Suzaki | 350/96.15 |
| 4,165,150 | 8/1979 | Duck et al. | 350/96.15 |

Primary Examiner—Stewart J. Levy
Attorney, Agent, or Firm—R. S. Sciascia; William T. Ellis

[57] ABSTRACT

A single-mode or multimode, optical, fiber-to-fiber coupler which couples such fibers together so that an optical beam guided by one fiber is coupled to the other fiber through evanescent field coupling. In coupling fibers together, the plastic coating is removed along a desired length of each fiber. The fibers are twisted or braided together and cladding is etched to a desired diameter in a suitable housing. After etching, the etchant is drained and the fibers and inside of the housing are cleaned by any suitable cleaning solution. Subsequent to cleaning, the housing is filled with a solution or material which has an index of refraction which is less than that of the core. It has been determined that coupling efficiency can be controlled simply by adjusting the tension of the coupling fibers.

6 Claims, 6 Drawing Figures

OPTICAL FIBER-TO-FIBER EVANESCENT FIELD COUPLER

BACKGROUND OF THE INVENTION

This invention relates to optical fiber-to-fiber couplers and more particularly to evanescent field coupling between single-mode fibers as well as multimode fibers.

The development of lasers that produce coherent light has brought about research in the use of laser light in communication systems using optical fibers. One of the major problems involving the use of optical fibers in a communication system concerns means for coupling optical signals from one fiber to another. Through the use of optical couplers, an optical signal can be shared by, and distributed among a multiplicity of optical fibers.

In multimode fibers, the core diameter is comparable to the core-cladding total diameter, and intermodal scattering prevails when a perturbation is introduced to the guiding system. Thus, multimode fiber couplers mix and distribute optical energy among a plurality of fibers by first converting guided modes to cladding modes or unguided modes, and then converting the cladding modes or unguided modes back to the guided modes. An example of this kind of mixer coupler can be found in U.S. Pat. No. 4,087,156. This kind of optical coupler or mixer is not proper for the applications where fine control of coupling efficiency is required. Furthermore, it would not work efficiently with single-mode fibers since the core diameter of single-mode fibers is much less than the total diameter and, more importantly, scattering loss would be much larger compared to the multimode fiber cases for the same amount of perturbation. In other words, in single-mode fibers, it is very difficult to couple an optical beam into the fiber core with high-efficiency after it has leaked out of the core.

SUMMARY OF THE INVENTION

This invention relates to an optical, fiber-to-fiber, evanescent field coupler and method for coupling an optical beam from one or more fibers to another fiber or fibers. The plastic jacket is removed from the fibers and the fibers (single-mode or multimode) are passed through a chamber or housing (preferable etch-resistant) having aligned openings until the jacket-free sections of the optical fibers are confined within the chamber. An etchant is poured into the chamber and the cladding is etched away down to the core or near it. After etching, the etchant is drained and the inner wall of the housing and the fibers are cleaned with a cleaner such as pure water. After cleaning, a liquid such as oil, glue, or any other desired material with the proper index of refraction (less than that of the core) is injected into the chamber. The material injected into the chamber may be of a solution of either a type which remains as a solution permanently or of a type which can be solidified during a curing process, thus, forming a solid encapsulant.

DETAILED DESCRIPTION

Figure 1:
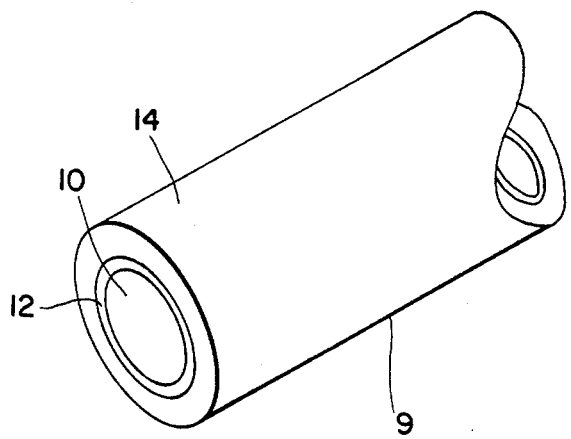
FIG. 1 is a perspective view of a multimode optical fiber.

FIG. 1 illustrates a typical multimode optical fiber 9. As shown, the fiber includes a central core 10, a cladding 12 of lesser index of refraction than that of the core and a protective jacket 14 usually made of plastic. The core diameter is usually about 100 $\mu$m with the outer diameter of the cladding about 120 $\mu$m. The protective jacket can be of any desired thickness.

Figure 2:
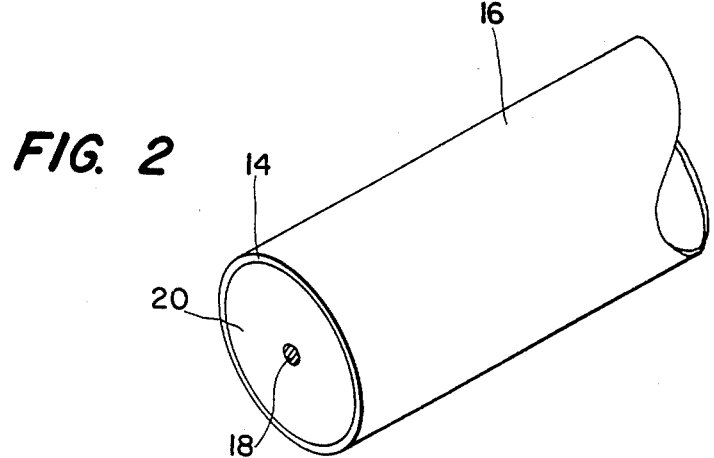
FIG. 2 is a perspective view of a single-mode fiber.

FIG. 2 illustrates a typical single-mode optical fiber 16. The diameter of the core 18 is about 5 $\mu$m, even less, with a cladding 20 having an outer diameter of about 50 $\mu$m or larger and of an index of refraction less than that of the core. In some instances, a second layer of cladding surrounds the first layer to form a single-mode optical fiber with an outer diameter of about 90 $\mu$m. In either case, the cladding is surrounded with a protective jacket 14.

Most single-mode and multimode optical fibers are made of fused silica doped with small amounts of boron, phosphorus or germanium. The cladding surrounding the core may have the same index of refraction throughout its thickness, with the cladding having an index of refraction less than that of the core. The corecladding boundary may be either abrupt or graded along the radial direction. In the latter case, the index of refraction is greatest or maximum at the core center and gradually decreases along the radial direction. In carrying out the teaching of this invention the material outside of the core has an index of refraction which is less than that of the core.

The optical field of a signal being transmitted through an optical fiber is rather tightly concentrated inside the optical fiber core with a small portion of the optical field, up to 40%, existing in the cladding. The optical field in the cladding region is called the evanescent field while the optical field inside the core region is called the oscillatory field. The evanescent field usually decays over a short distance from the core-cladding boundary and is negligible at the cladding-jacket boundary.

As set forth above, the core-cladding boundary may be abrupt or graded along the radial direction. Thus, the index of refraction may be maximum at the core center and decrease gradually along the radial direction or be uniform throughout the core and cladding, with the cladding having a lower index of refraction than that of the core. The optical beam guiding mechanism is basically the same in both the cases, and even in the case where the core-cladding boundary is graded there will always exist an oscillatory field in the center region and an evanescent field in the outer region with a definite radius where one field changes to the other.

Figure 3:
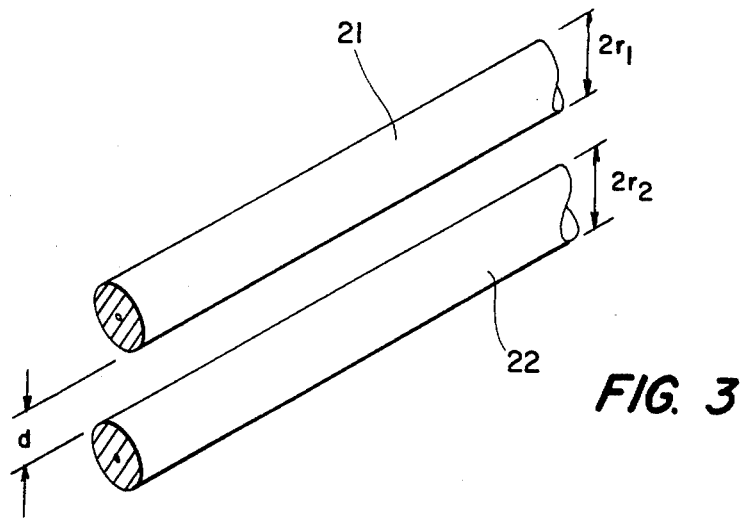
FIG. 3 illustrates side-by-side cores of separate optical fibers brought close together for evanescent field coupling from one fiber to the other.

In order to couple an optical beam from one single-mode fiber or multimode fiber to another through evanescent field coupling, it is necessary that the cores of the fibers be sufficiently close together that the two fibers have overlapping evanescent fields. Such a coupling is explained using FIG. 3. FIG. 3 illustrates two optical fiber cores 21 and 22 spaced from each other by a distance, d. The spacing, d, between the two cores should be less than a few microns if the evanescent field coupling is to be substantial and practically useful. Thus, in single-mode fibers as well as multimode fibers, almost all of the cladding must be removed before two adjacent fibers have evanescent field overlap, which is necessary for optical couplings. Thus, in the case of single-mode fiber coupling, the final radius of the fibers would be only a few microns before the evanescent field coupling occurs.

Figure 4:
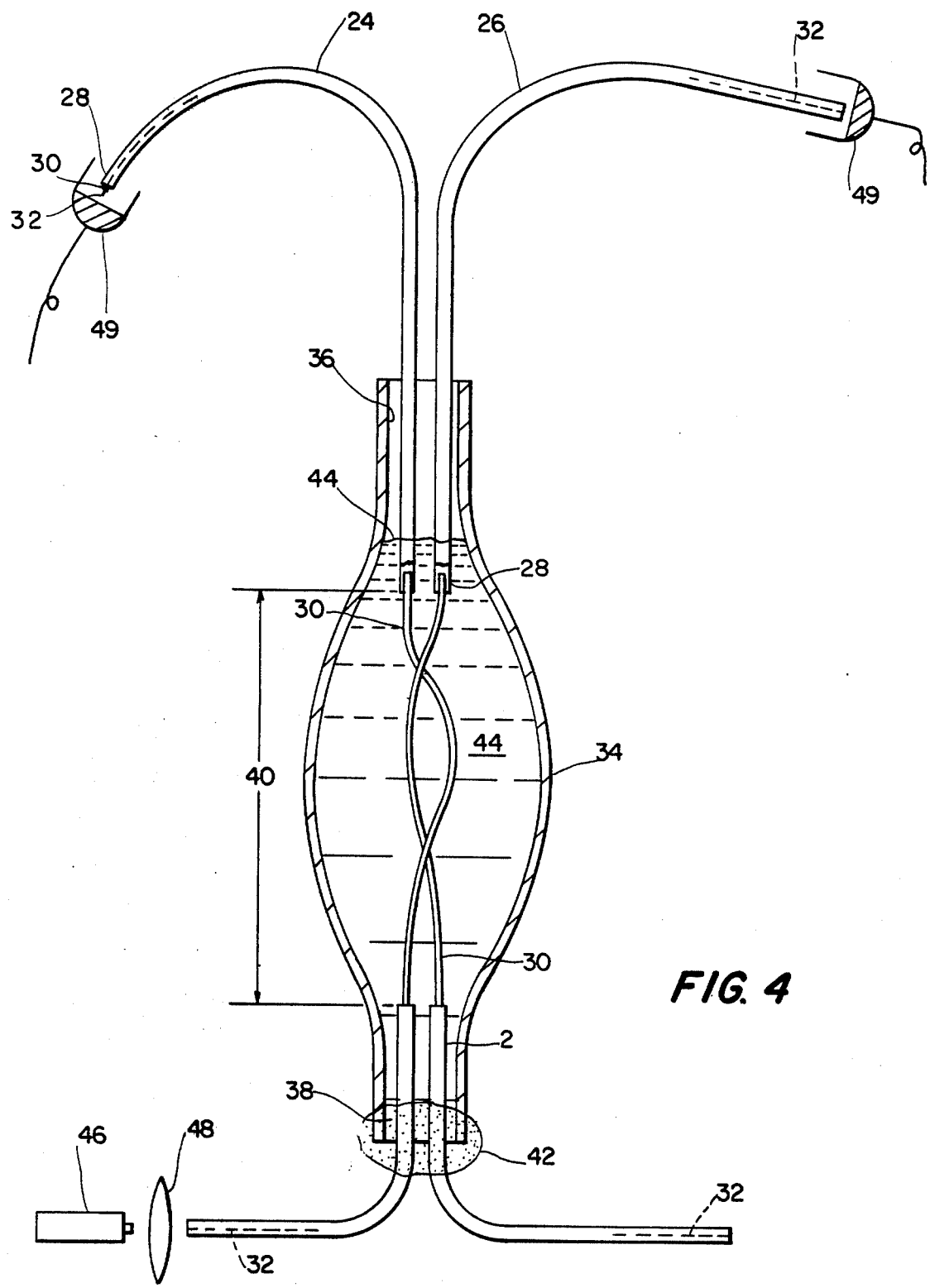
FIG. 4 is a partial cross-sectional view of a coupling means during etching of the cladding.

FIG. 4 illustrates two optical fibers 24 and 26 including a plastic covering 28, a cladding 30 and a core 32, which are coupled together in accordance with the method of this invention. The coupling includes a container or housing 34 made of some material such as teflon that will not be attached by an etchant to be used. The housing 34 may be made of a material such as glass that may be attacked by the etchant; however, the wall of the housing 34 must be much thicker than the fiber diameter so that the cladding will be etched sufficiently before the housing becomes etched too much to confine the solution or to function as a coupler. The housing 34 has aligned openings 36 and 38 in its opposing ends. The two optical fibers 24 and 26 are stripped of their plastic protective layer 28 over a convenient length 40 thereby exposing the cladding 30 which surrounds the core 32 along the length of the fiber to be coupled together. The two fibers may be twisted together along the stripped length for better contact and better coupling of optical signals. The ends of the two fibers are inserted into opening 36 in one end of the housing and pushed out through opening 38 in the opposite end until the stripped lengths 40 of the fibers to be coupled are within the chamber. The bottom opening 38 of the chamber is then sealed with an appropriate sealant 42 such as Duco cement which will not be attacked by the etchant. An etchant 44 is of a type, such as HF:NH$_4$F, which will etch-away the cladding. The etchant is injected into the chamber through the upper end to fill the chamber. The cladding may be completely etched away or only etched sufficiently that the evanescent field of the optical beam being guided by either one of the coupling optical fibers is accessible and coupled to the other optical fiber.

In order to determine when the evanescent field is being coupled, the coupling efficiency may be monitored by launching a guided laser beam into one end of one of the optical fibers using a laser 46 and focusing lens 48, and measuring the outputs of the two fibers at the opposite or receiving ends using an appropriate light detector 49. If the etching rate of the chemical is known, the optical monitoring may be omitted.

Figure 5:
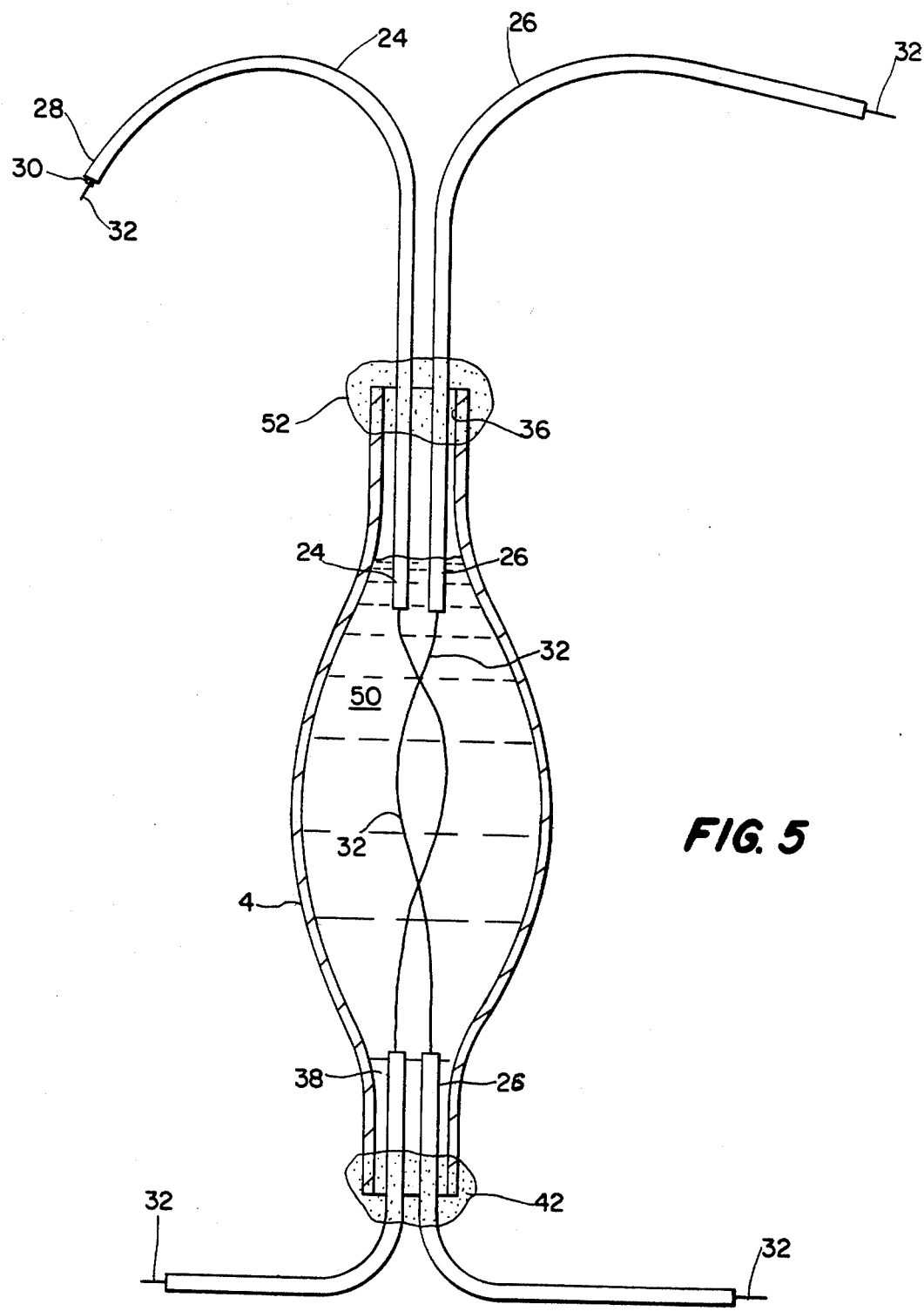
FIG. 5 is a partial cross-sectional view of a completed coupling means shown with optical fibers coupled therein.

After the etching step has been achieved to a desirable level, the etchant is drained from the chamber through the opening 36. As soon as the etchant has been drained, the inside of the container and the etched-optical fiber sections are cleaned repeatedly by use of a suitable cleaning solution such as pure water until they are free of any etchant. The cleaning solution is drained from the chamber and an oil 50 or other solution with an index of refraction just less than that of the core 32 is injected or poured into the chamber to fill the chamber, as shown in FIG. 5. Once the chamber has been filled with the solution, the open end 36 is sealed by a sealant 52 and the coupling is completed. FIG. 5 illustrates a complete coupling.

The oil or other solution added to the chamber may be of a material which remains as a solution or one that solidifies after proper curing. If left as a solution, it should be of a material that will not freeze at low temperatures or at temperatures in which the coupling will be used.

In carrying out the above process, the optical fibers may be supported at the top of the chamber to hold them in place during the coupling process and to control the tension of the optical fibers during coupling.

Figure 6:
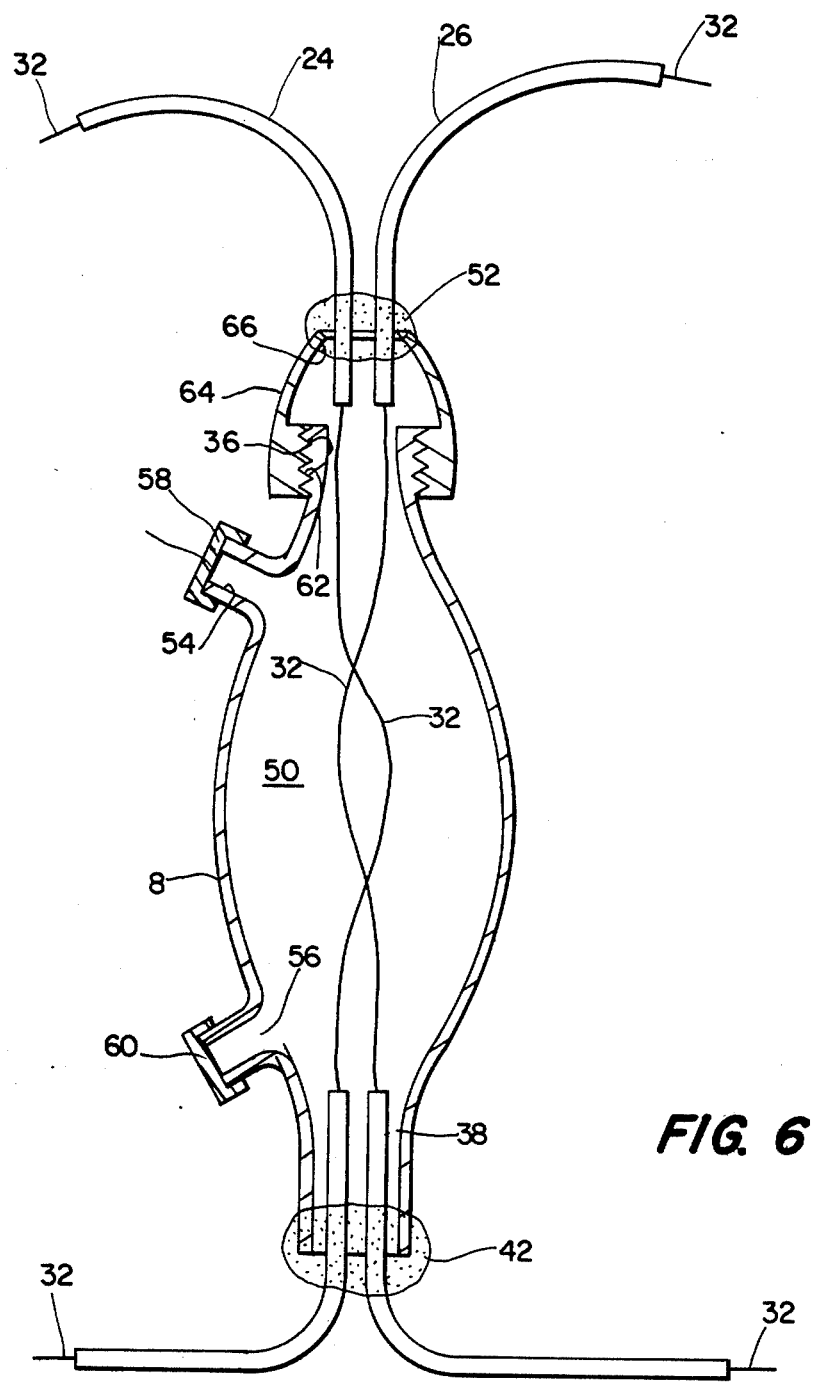
FIG. 6 illustrates a modification of the coupler shown by illustration in FIGS. 4 and 5.

FIG. 6 illustrates a modification of the housing described above in carrying out the process. The housing, as shown in FIG. 6, includes an additional opening 54 near the upper opening 36 therein which may be used for adding the etchant, cleaning solution and proper refractive index material to the chamber. An opening 56 is shown near the bottom opening 38 which may be used for draining the etchant and cleaning solution. The openings 54 and 56 may be provided with covers 58 and 60 which close the openings when they are not in use for their intended purposes. The upper open end of the housing is provided with threads 62 to which a threaded cap 64 is affixed. The cap has an opening 66 in its upper end through which the optical fibers pass.

In using the housing shown in FIG. 6 to carry out the method, the optical fibers are stripped of their plastic jacket over the desired length, about one inch or more, as described above. One end of each optical fiber is inserted through the opening 66 in the cap, which has been threaded onto the end of the housing, and these ends are then passed out through the opening 38 in the opposite end of the chamber. The optical fibers are then secured in place at the bottom opening by a suitable sealant 42 and the optical fibers are sealed in place by a sealant 52 at the opening 66 in the cap. The cap may be rotated around its axis for movement in a direction away from the housing opening 36 in order to place a tension on the optical fibers and/or to hold them in the desired position within the housing. Rotation of the cap also twists the fibers together. The method of etching, cleaning, and filling the housing is the same as set forth above except that openings 54 and 56 are used for filling and draining the housing, as necessary, during the process.

A housing such as shown in FIG. 6 could be used without a threaded cap by twisting the optical fibers prior to placing them through the chamber or by securing the optical fibers at the bottom end and then twisting the optical fibers prior to sealing the upper end of the chamber, as illustrated when the cap is used. In the latter case, the optical fibers will be fixed and their tension cannot be changed as it may be when using the threaded cap shown in FIG. 6.

The length of the section of the optical fiber that is etched need only be of sufficient length that the optical signal couple from one optical fiber to the other. Consequently the length of the coupling housing need be only sufficiently long to carry out the process depending upon the length of the fiber section to be etched. The housing should be of a diameter that it will contain enough etchant so that the chemical reaction of the etchant will be sufficient to etch the cladding to a desired level or if the housing is smaller, that the etchant may be replaced by new etchant until the final diameter has been accomplished.

It is seen that, through the use of the process set forth herein, the optical fibers are not touched or handled subsequent to etching, and the optical fibers, especially single-mode fibers, are held in place so that they have much less chance to break or be damaged during the coupler fabrication process.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A fiber-to-fiber coupler for coupling the evanescent field of adjacent optical fibers which fibers include a core and surrounding cladding which has an index of refraction less than that of the core comprising:

a housing including a chamber with openings communicating to the outside thereof;

a pair of the openings located on generally opposite portions of the housing;

said pair of openings sealingly receiving therethrough plural optical fibers which extend in adjacency through the chamber;

that portion of the optical fibers which extend through the chamber having had a substantial thickness of the surrounding cladding removed;

adjustable cap means provided on the housing around the openings and receiving the cladded fibers therethrough;

said adjustable cap means adapted to be twisted to twist about each other the optical fiber portions which extend through the chamber to adjust their tension and adjacency for controlling optical coupling;

said chamber filled with an optical material surrounding the optical fibers and having an index of refraction slightly less than that of the core whereby the evanescent field is coupled through the reduced thickness cladding from one core to the other.

2. The invention according to claim 1 wherein the adjustable cap means and housing adjacent the opening are connected by mating helical threading.

3. The invention according to claim 2 wherein the cap means when twisted both twists the optical fibers about each other and moves axially relative to the housing.

4. The invention according to claim 1 wherein the optical material is a liquid.

5. The invention according to claim 4 wherein the liquid is adapted to solidify upon curing.

6. The invention according to claim 1, 5 or 6 wherein the openings include additional openings in communication with the chamber through which the optical material is admitted to the chamber.

* * * * *